Nov. 6, 1962   A. E. BEGUIN   3,062,181
APPARATUS FOR APPLYING MAGNETIC SOUND TRACK
Filed Sept. 2, 1960

Albert E. Beguin
INVENTOR.

BY R. Frank Smith
Robert T. Crocker
ATTORNEYS

United States Patent Office 3,062,181
Patented Nov. 6, 1962

3,062,181
APPARATUS FOR APPLYING MAGNETIC
SOUND TRACK
Albert E. Beguin, Rochester, N.Y., assignor to Eastman
Kodak Company, Rochester, N.Y., a corporation of
New Jersey
Filed Sept. 2, 1960, Ser. No. 53,820
8 Claims. (Cl. 118—407)

This invention relates to an extrusion apparatus and particularly to such an apparatus for use in applying a magnetic sound-recording stripe or track to 8 mm. motion picture film.

For some time the advantages of utilizing magnetic sound tracks in conjunction with motion picture films have been recognized and, in fact, the use of such tracks in conjunction with 16 mm. motion picture film has become quite common. However, attempts to use magnetic tracks in conjunction with 8 mm. film have, until the present time, been quite unsatisfactory. Due to the small size of this film, it is necessary that the sound track be located in the very narrow strip between the perforations and the adjacent edge of the film and it has been substantially impossible with prior known equipment to provide a stripe in this restricted area of the high degree of uniformity necessary for good sound reproduction.

It is an object of this invention to provide an extrusion type hopper for applying a magnetic sound track of extremely great uniformity even under the adverse conditions discussed above.

It is a further object to provide such an extrusion apparatus which includes relatively sharp knife edges at the sides of the extrusion orifice, said knife edges serving to limit the lateral spreading of the magnetic dispersion during its extrusion onto the film base.

A still further object is to provide such an extrusion hopper which will permit extremely precise control of the amount and cross-sectional shape of the magnetic material as it is extruded onto the film base and which, at the same time, consists of but a relatively few parts of simple fabrication.

Further objects will become apparent from the following description and claims, particularly in the light of the appended drawing wherein:

Figure 6:
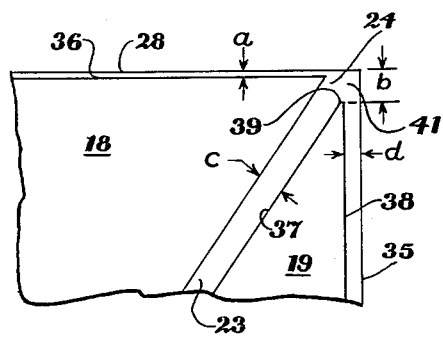
Figure 5:
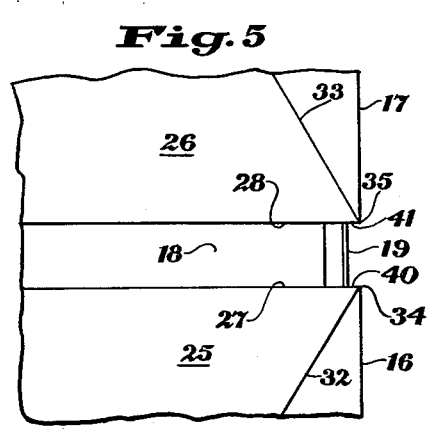

FIGS. 5, and 6 are enlarged fragmentary views of the tip portion of my hopper.

Figure 7:
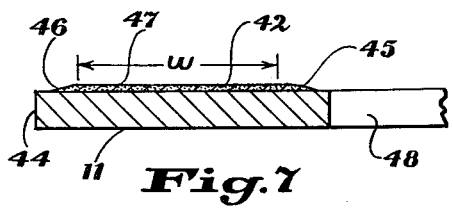

FIG. 7 is an enlarged cross-section through the edge portion of a strip of motion picture film to which a magnetic stripe has been applied by my improved hopper.

Figure 1:
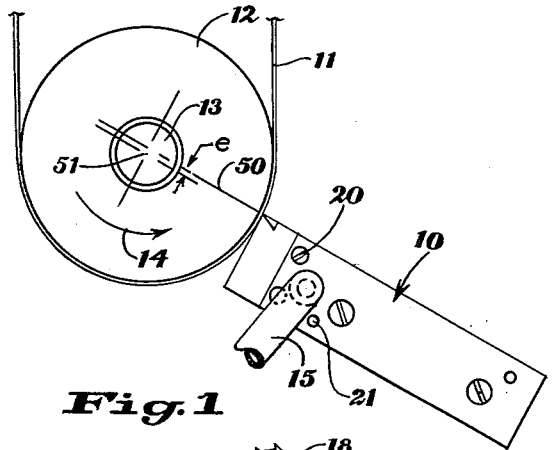
FIG. 1 is a somewhat diagrammatic view showing my improved hopper in operative position.

Referring now to FIG. 1, my improved extrusion hopper 10 is shown supported (by means, not shown) in operative relationship to a film strip 11 passing around a drum 12 carried by a suitable shaft 13 and rotating in the direction of the arrow 14. Magnetic dispersion to be applied to the film is adapted to be supplied continuously to the hopper 10 by suitable metering pumps (not shown), by way of the supply pipe 15.

Figures 2, 3:
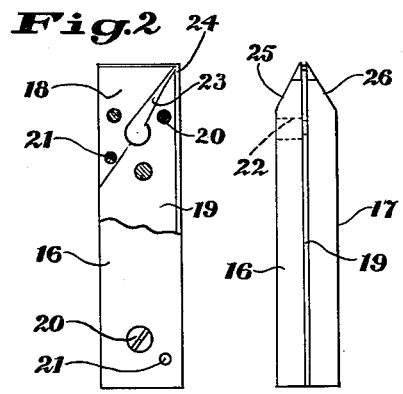
FIG. 2 is a fragmentary side view of my hopper with one side plate broken away to show the internal construction.
FIG. 3 is a front edge view of my hopper.
Figure 4:
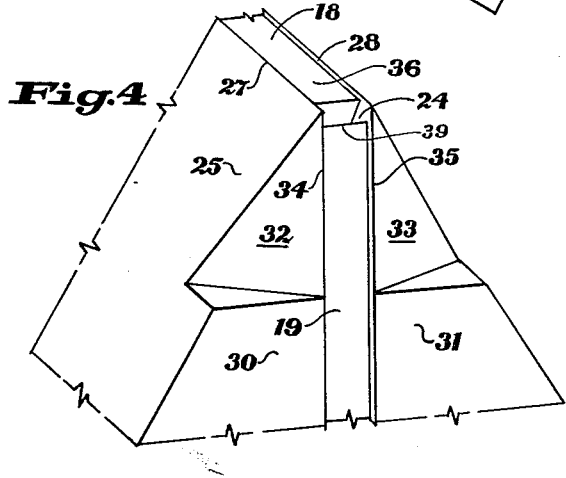
FIG. 4 is an enlarged fragmentary perspective view of the tip portion of my apparatus.

The hopper 10 is shown as comprising a pair of generally rectangular side plates 16 and 17 separated by suitable spacer plates 18 and 19 sandwiched therebetween. As best shown in FIGS. 1 and 2 these parts are held together by suitable bolts 20 and locating pins 21 to effectively form a unitary rigid assembly. Side plate 16 is provided, as shown in FIG. 3, with a suitable threaded bore 22 for reception of the supply pipe 15 while the side plates 16, 17 and spacer plates 18, 19 are so arranged as to conjointly form therebetween an extrusion nozzle or passageway 23 which extends from the bore 22 to an orifice 24 at the forward tip corner of the assembly. As is best shown in FIGS. 3 and 4, the upper ends 25, 26 of the members 16 and 17 are tapered toward their inner faces to form along their extreme upper edges a pair of spaced parallel knife edges 27 and 28 respectively. Similarly the forward edge portions 30, 31 of these side plates are bevelled, at least at their tip portions 32 and 33, to provide a second pair of knife edges 34 and 35 which are effectively continuations of knife edges 27 and 28 around the forward tip corner of the hopper.

As is best shown in FIG. 1, the knife edges 27 and 28 at the tip end of the hopper are adapted to be positioned in substantial contact with the surface of the film to which a magnetic stripe is being applied. To insure that this condition can obtain, the upper surface 36 of spacer plate 18 should be depressed below the plane of the knife edges 27 and 28 as indicated by the dimension $a$ in FIG. 6. As best shown in FIG. 6, the edge walls 37 and 38 of spacer plate 19 converge to form a relatively sharp tip or edge 39, the spacing $b$ of which below the knife edges 27, 28 serves, in conjunction with the thickness $c$ of the extrusion passageway 23, to determine the widthwise uniformity of thickness of the layer of dispersion as it is extruded onto the film base and therefore the final thickness of the dried stripe. The forward edge 38 of plate 19 as also set back somewhat from the knife edges 34 and 35 as indicated by the dimension $d$.

While the exact sizes of these dimensions will, of course, vary in accordance with the width and thicknesses of stripe to be applied, the consistency of the magnetic dispersion, the application rate, etc., the following general relationships should be maintained for most satisfactory results. The dimension $a$ should be large enough to ensure that the knife edges 27, 28, and not the edge 36 of spacer 18, determine the spacing of the hopper from the film being striped. If desired, the knife edge 27 or 28 which will be adjacent the perforations on the film being striped, may protrude slightly further above plate 18 than does the opposite knife edge. This will insure that maximum edge control of the stripe will be obtained in this area of the film, where the perforations tend to cause film distortions that might otherwise cause variations in the track adjacent thereto.

The dimension $b$ will depend upon the final stripe thickness desired and should be such that a slight back-pressure will be built up to ensure that the entire orifice area is full at all times and yet that this back-pressure is not so great as to cause flow of the dispersion laterally out beneath the knife edges 27, 28. The thickness $c$ of the channel 23 should be such that the material passes therethrough with a relatively high velocity so as to minimize separation of the constituents of the dispersion. The set-back $d$, while not too critical as to its exact size, should be sufficient to provide guiding walls 40, 41 formed by the inner faces of plates 16 and 17 adjacent the orifice 24 and extending forwardly therefrom and terminating in the knife edges 34, 35. These wall portions, with their knife edges, materially contribute to the lateral width control of the extruded stripe.

The sharper the knife edges 27, 28 and 34, 35 adjacent the orifice 24 the more nearly will the final width of the stripe correspond to the thickness of the spacer plates 18 and 19. However if they are made too sharp they become quite fragile and subject to undue wear, so that, as a practical matter, the general angular relationships shown in the drawing are quite satisfactory.

Following these general principles, a suitable hopper for applying a .0315 inch wide stripe of .00045 inch thickness between the perforations and the adjacent edge of 8 mm. film might have the following dimensions:

The spacer plates 18 and 19, and therefore the width of the orifice 24 should be between .0255 and .0275 inch with the upper edge 36 of plate 18, set .001 to .002 inch below the level of the edges 27, 28 and the forward edge 38 of plate 19 set back from knife edge 34, 35 between .003 and .010 inch. The distance $b$ should be between .010 and .015 inch while the thickness $c$ of the extrusion passage should be about .010 inch.

The hopper should be supported so that a line 50 (see FIG. 1) coinciding with the knife edge 34 or 35, if extended, would pass close to but just forwardly of the axis of rotation 51 of the drum 12 as indicated by the dimension $e$ in FIG. 1. So long as this general relationship obtains the hopper may be used in any position relative to the horizontal or vertical, the particular mounting angle shown in FIG. 1 being merely illustrative. Thus when, in the description and claims, I refer to the upper end of the hopper, this is merely for ease in description in relation to FIGS. 2 to 6, and in no way should be interpreted as meaning that the "upper end" must be at the top during actual use.

FIG. 7 shows the final configuration of a magnetic track 42 applied by use of my hopper to a strip 11 of 8 mm. film in the area between the perforations 48 and adjacent edge 44 thereof. As shown, the edge portions 45 and 46 of the stripe or track 42 taper downwardly toward the film surface but the major central portion 47 of the track is substantially flat and of uniform width and thickness throughout its length. With a track having an overall width of .0315 inch, the width $w$ of this flat portion 45 is more than sufficient to accommodate a .020 inch wide transducer head without undue longitudinal tracking problems. The extreme uniformity, both in thickness and in width, of such a stripe as applied with my improved hopper, coupled with the high degree of accuracy of placement of the stripe due to the use of the hopper, makes it now feasible to obtain excellent quality sound reproduction from 8 mm. film despite the strenuous limitations imposed by the small size and normal manner of use of such film. While the apparatus shown has been particularly described as being intended for applying a magnetic sound track to motion picture film, it will be obvious to those skilled in the art that the principles involved could be equally well applied to hoppers intended for other uses.

While the spacing means for spacing the side members 16 and 17 and for forming therewith the extrusion channel 23 has been shown and described as constituted by two separate plates 18 and 19, it will be obvious that a single spacer plate provided with a suitable slot corresponding to channel 23 could be substituted without affecting the operation in any way. Moreover it is obviously not essential to the proper operation of the hopper that the knife edges 27 and 28 extend clear across the top of the hopper since it is only those portions thereof in the immediate vicinity of the orifice 24 that have any effect on the operation. The shape and structural relationships of the parts remote from the orifice area can therefore be subject to considerable change without in any way adversely affecting the operation of the device or departing from the spirit and scope of the invention as defined by the appended claims.

I claim:

1. Extrusion apparatus for extruding a strip of extrudable material of predetermined lateral width and thickness comprising a pair of outer plates and spacer plate means sandwiched between said outer plates and forming therewith an extrusion passage between said plates directed toward and terminating in an orifice substantially at one corner of said plates, both the end and side edge portions of said outer plates in the vicinity of said orifice extending beyond the corresponding edges of said spacer plate means and being bevelled to form respective pairs of knife edges in substantial alignment with the inner faces of said side plates defining the lateral width of said orifice.

2. Extrusion apparatus as in claim 1 wherein said spacer plate means is so formed that the edge of said orifice nearest the bevelled side edges of said plates is displaced further from the bevelled end edges of said plates than is the opposite edge of said orifice.

3. An extrusion hopper for extruding a strip of extrudable material of predetermined lateral width and thickness comprising a pair of spaced parallel outer plate members and spacer means sandwiched between said plate members to maintain the latter in said spaced parallel relationship, said spacer means being provided with an extrusion passageway opening to the exterior adjacent the corner of said hopper defined by one end and one side edge of said plate members, both the end and edge surfaces of said plate members in the vicinity of said opening being bevelled to form substantial knife edges at the intersection of said edges with the inner faces of said wall members defining the lateral width of said orifice.

4. Extrusion apparatus for extruding a strip of extrudable material of predetermined lateral width and thickness comprising a hopper, one end edge and one side edge of which conjointly define a tip portion in the area of their intersection, said hopper being provided with an internal extrusion passage directed toward and terminating in an orifice at said tip portion, said end and side edges of said hopper in the vicinity of said orifice being bevelled to form effective knife edges defining the width of said orifice.

5. Apparatus as in claim 4 wherein the intermediate portions of said end and side edges adjacent said orifice and lying between said bevelled portions are set back slightly relative thereto, whereby the said knife edges extend outwardly beyond said intermediate edge portions.

6. Extrusion apparatus for extruding a strip of extrudable material of predetermined lateral width and thickness comprising a pair of opposed outer plates of generally rectangular configuration, and spacer plate means sandwiched therebetween and forming therewith an extrusion passage between said outer plates directed toward and terminating in an orifice substantially at one corner of said outer plates, the end and side edge walls of said opposed plates in the vicinity of said orifice being tapered toward one another to conjointly form opposed pairs of parallel knife edges in alignment with their inner surfaces defining the lateral width of said orifice.

7. Extrusion apparatus as in claim 6 wherein the end and side edges of said spacer plate means adjacent said knife edges are recessed relative thereto whereby said knife edges protrude slightly beyond said edges of said spacer plate.

8. Extrusion apparatus as in claim 6 having in combination therewith a roller adapted to guide a strip to be coated past said orifice in close proximity thereto, said outer plates being so positioned relative to said roller that straight lines forming continuations of said side edge walls will be displaced slightly to that side of the axis of rotation of said roller which corresponds to the direction of movement of said strip past said orifice.

References Cited in the file of this patent

UNITED STATES PATENTS

| | | |
|---|---|---|
| 2,097,573 | Newhall | Nov. 2, 1937 |
| 2,225,066 | MacKenzie | Dec. 17, 1940 |
| 2,681,294 | Beguin | June 15, 1954 |
| 2,761,418 | Russell | Sept. 4, 1956 |
| 2,864,333 | Sorg et al. | Dec. 16, 1958 |
| 2,879,176 | Franck et al. | Mar. 24, 1959 |